(12) United States Patent
Chang et al.

(10) Patent No.: US 8,544,039 B2
(45) Date of Patent: Sep. 24, 2013

(54) METHOD AND APPARATUS FOR DISTRIBUTING CONSUMER ADVERTISEMENTS

(75) Inventors: E-Lee Chang, Mableton, GA (US); John R. Stefanik, Atlanta, GA (US); Charles Patrick Bradley, Lawrenceville, GA (US); Tuck Seng Tan, Lithia Springs, GA (US); Darnell Clayton, Atlanta, GA (US); Madhur Khandelwal, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 975 days.

(21) Appl. No.: 12/202,558

(22) Filed: Sep. 2, 2008

(65) Prior Publication Data

US 2010/0058383 A1      Mar. 4, 2010

(51) Int. Cl.
*H04N 7/10* (2006.01)
*H04N 7/025* (2006.01)

(52) U.S. Cl.
USPC ............... 725/35; 725/34; 725/42; 725/43; 725/44; 725/46; 705/14.49; 705/14.51; 705/14.71; 705/14.72; 705/14.73; 703/23

(58) Field of Classification Search
None
See application file for complete search history.

(56) References Cited

U.S. PATENT DOCUMENTS

| | | | |
|---|---|---|---|
| 6,718,551 B1 | 4/2004 | Swix et al. | |
| 2001/0034635 A1* | 10/2001 | Winters | 705/10 |
| 2001/0041973 A1* | 11/2001 | Abkowitz et al. | 703/23 |
| 2004/0172650 A1* | 9/2004 | Hawkins et al. | 725/46 |
| 2004/0181457 A1* | 9/2004 | Biebesheimer et al. | 705/26 |
| 2006/0015904 A1* | 1/2006 | Marcus | 725/46 |
| 2007/0124762 A1* | 5/2007 | Chickering et al. | 725/35 |
| 2007/0242659 A1* | 10/2007 | Cantu et al. | 370/352 |
| 2007/0288595 A1* | 12/2007 | Cohen | 709/217 |
| 2008/0027801 A1 | 1/2008 | Walter et al. | |
| 2008/0060002 A1 | 3/2008 | Noll et al. | |
| 2008/0066096 A1 | 3/2008 | Wollmershauser et al. | |
| 2008/0114648 A1 | 5/2008 | Chen et al. | |
| 2008/0207182 A1* | 8/2008 | Maharajh et al. | 455/414.1 |

* cited by examiner

*Primary Examiner* — Joshua Taylor
(74) *Attorney, Agent, or Firm* — Guntin & Gust, PLC; Ralph Trementozzi

(57) ABSTRACT

A system that incorporates teachings of the present disclosure may include, for example, a set-top box (STB) having a controller to present a plurality of advertisement categories, detect a selection of one of the plurality of advertisement categories, present an advertisement template associated with the selected advertisement category, detect a plurality of entries in the advertisement template for constructing a consumer classified advertisement, generate an advertisement graphical user interface (GUI) corresponding to the entries, detect one or more demographic patterns in the plurality of entries, identify a plurality of users of a media communication system from which the STB operates according to the detected one or more demographic patterns, and provide the plurality of users of the media communication system accessibility to the advertisement GUI. Other embodiments are disclosed.

26 Claims, 13 Drawing Sheets

100

600

METHOD AND APPARATUS FOR DISTRIBUTING CONSUMER ADVERTISEMENTS

FIELD OF THE DISCLOSURE

The present disclosure relates generally to techniques for distributing consumer classified advertisements and more specifically to a method and apparatus for distributing consumer advertisements.

BACKGROUND

The general public can advertise products or services by way of consumption media such as a classified section of a newspaper, advertisement space purchased from a magazine publisher, targeted email distributions, or a webpage or portal. How successful individuals are in selling products or services can largely depend on how well the advertisement matches the interests of the targeted consumers.

DETAILED DESCRIPTION

One embodiment of the present disclosure entails a set-top box (STB) having a controller to present a plurality of advertisement categories, detect a selection of one of the plurality of advertisement categories, present an advertisement template associated with the selected advertisement category, detect a plurality of entries in the advertisement template for constructing a consumer classified advertisement, generate an advertisement graphical user interface (GUI) corresponding to the entries, detect one or more demographic patterns in the plurality of entries, identify a plurality of users of a media communication system from which the STB operates according to the detected one or more demographic patterns, and provide the plurality of users of the media communication system accessibility to the advertisement GUI.

Another embodiment of the present disclosure entails a network element of a media communication system having a controller to receive from a media processor a request to advertise a good or a service of a user of the media processor, present the media processor with a plurality of advertisement categories, detect from the media processor a selection of one of the plurality of advertisement categories, present the media processor with an advertisement template associated with the selected advertisement category, detect at the media processor a plurality of entries in the advertisement template, generate an advertisement user interface (UI) corresponding to the entries, detect one or more behavioral patterns in at least one of the plurality of entries and other sources of demographic data associated with the user, identify a plurality of subscribers of the media communication system with a behavioral profile similar to the detected one or more behavioral patterns, and distribute the advertisement UI to the identified plurality of subscribers.

Yet another embodiment of the present disclosure entails a method involving distributing advertisements in an interactive television (iTV) system. The advertisements can be generated by subscribers of the iTV system by way of a media processor communicatively coupled to the iTV system.

Figure 1:
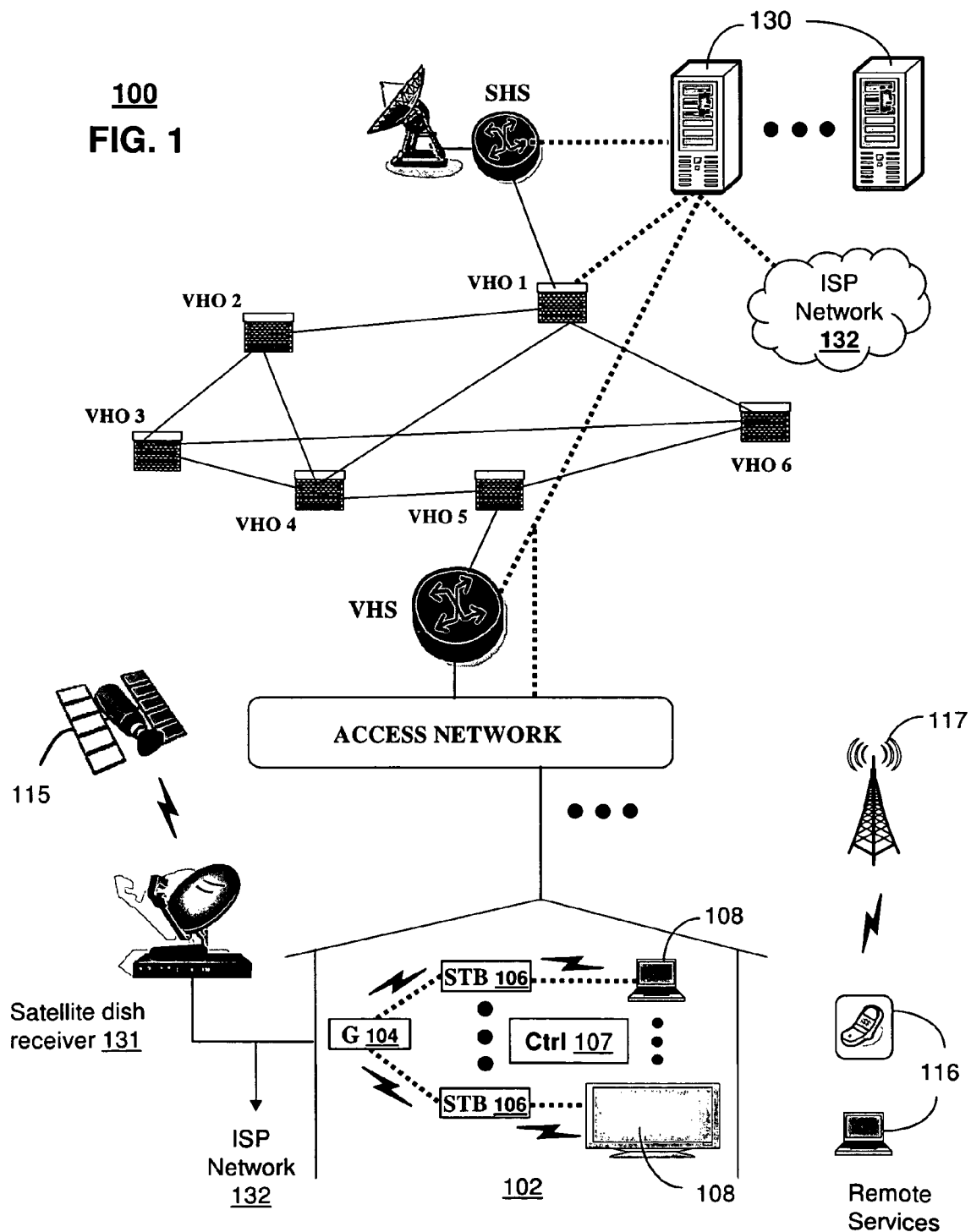
FIGS. 1-4 depict illustrative embodiments of communication systems that provide media services.

FIG. 1 depicts an illustrative embodiment of a first communication system 100 for delivering media content. The communication system 100 can represent an Internet Protocol Television (IPTV) broadcast media system. In a typical IPTV infrastructure, there is a super head-end office (SHO) with at least one super headend office server (SHS) which receives national media programs from satellite and/or media servers from service providers of multimedia broadcast channels. In the present context, media programs can represent audio content, moving image content such as videos, still image content, and/or combinations thereof. The SHS server forwards IP packets associated with the media content to video head-end servers (VHS) via a network of aggregation points such as video head-end offices (VHO) according to a common multicast communication method.

The VHS then distributes multimedia broadcast programs via an access network to commercial and/or residential buildings 102 housing a gateway 104 (e.g., a residential gateway or RG). The access network can represent a bank of digital subscriber line access multiplexers (DSLAMs) located in a central office or a service area interface that provide broadband services over optical links or copper twisted pairs to buildings 102. The gateway 104 distributes broadcast signals to media processors 106 such as Set-Top Boxes (STBs) which in turn present broadcast selections to media devices 108 such as computers or television sets managed in some instances by a media controller 107 (e.g., an infrared or RF remote control). Unicast traffic can also be exchanged between the media processors 106 and subsystems of the IPTV media system for services such as video-on-demand (VoD). It will be appreciated by one of ordinary skill in the art that the media devices 108 and/or portable communication devices 116 shown in FIG. 1 can be an integral part of the media processor 106 and can be communicatively coupled to the gateway 104. In this particular embodiment, an integral device such as described can receive, respond, process and present multicast or unicast media content.

The IPTV media system can be coupled to one or more computing devices 130 a portion of which can operate as a web server for providing portal services over an Internet Service Provider (ISP) network 132 to fixed line media devices 108 or portable communication devices 116 by way of a wireless access point 117 providing Wireless Fidelity or WiFi services, or cellular communication services (e.g., GSM, CDMA, UMTS, WiMAX, etc.). Another distinct portion of the one or more computing devices 130 can be used as a web server which can operate independently of the web server mentioned above or can be an integral part thereof. The web server, which will be referred to herein as web server 130, can be used for developing web pages, and/or presenting web pages to presentation devices operably coupled to the first communication system 100. The web pages can represent graphical user interface (GUIs) for disseminating consumer advertisements.

A satellite broadcast television system can be used in place of the IPTV media system. In this embodiment, signals transmitted by a satellite 115 can be intercepted by a satellite dish receiver 131 coupled to building 102 which conveys media signals to the media processors 106. The media receivers 106 can be equipped with a broadband port to the ISP network 132. Although not shown, the communication system 100 can also be combined or replaced with analog or digital broadcast distributions systems such as cable TV systems.

Figure 2:
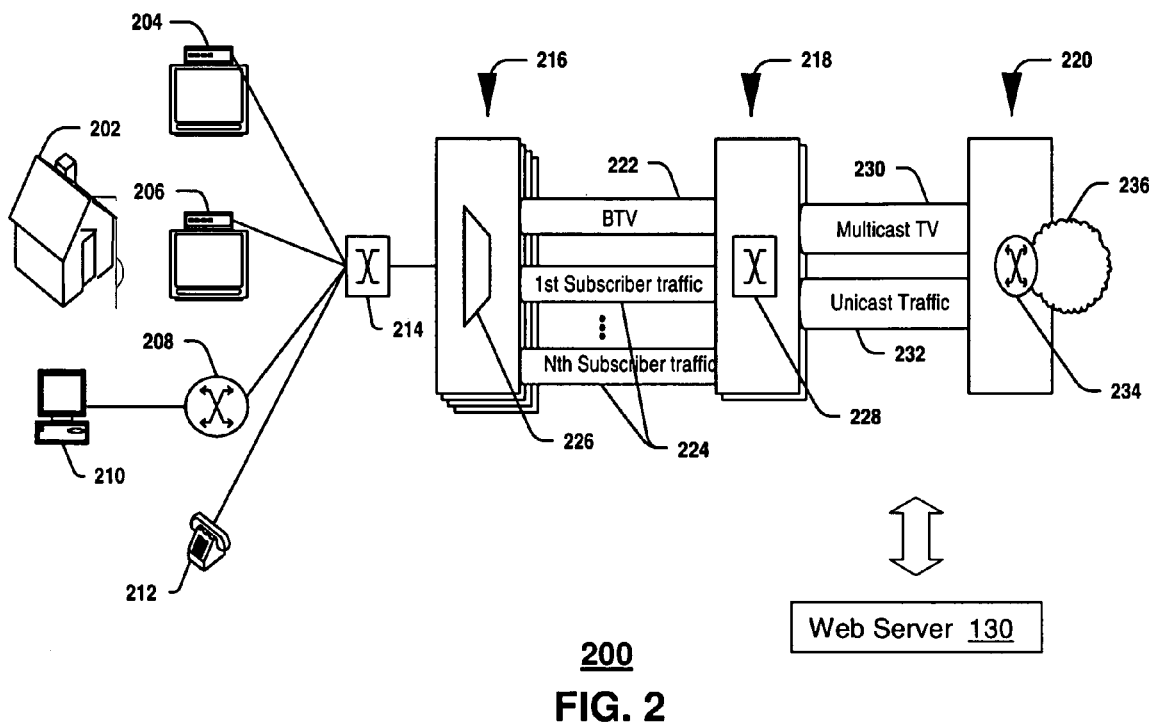

FIG. 2 depicts an illustrative embodiment of a second communication system 200 for delivering media content. Communication system 200 can be overlaid or operably coupled with communication system 100 as another representative embodiment of said communication system. The system 200 includes a distribution switch/router system 228 at a central office 218. The distribution switch/router system 228 receives video data via a multicast television stream 230 from a second distribution switch/router 234 at an intermediate office 220. The multicast television stream 230 includes Internet Protocol (IP) data packets addressed to a multicast IP address associated with a television channel. The distribution switch/router system 228 can cache data associated with each television channel received from the intermediate office 220.

The distribution switch/router system 228 also receives unicast data traffic from the intermediate office 220 via a unicast traffic stream 232. The unicast traffic stream 232 includes data packets related to devices located at a particular residence, such as the residence 202. For example, the unicast traffic stream 232 can include data traffic related to a digital subscriber line, a telephone line, another data connection, or any combination thereof. To illustrate, the unicast traffic stream 232 can communicate data packets to and from a telephone 212 associated with a subscriber at the residence 202. The telephone 212 can be a Voice over Internet Protocol (VoIP) telephone. To further illustrate, the unicast traffic stream 232 can communicate data packets to and from a personal computer 210 at the residence 202 via one or more data routers 208. In an additional illustration, the unicast traffic stream 232 can communicate data packets to and from a set-top box device, such as the set-top box devices 204, 206. The unicast traffic stream 232 can communicate data packets to and from the devices located at the residence 202 via one or more residential gateways 214 associated with the residence 202.

The distribution switch/router system 228 can send data to one or more access switch/router systems 226. The access switch/router system 226 can include or be included within a service area interface 216. In a particular embodiment, the access switch/router system 226 can include a DSLAM. The access switch/router system 226 can receive data from the distribution switch/router system 228 via a broadcast television (BTV) stream 222 and a plurality of unicast subscriber traffic streams 224. The BTV stream 222 can be used to communicate video data packets associated with a multicast stream.

For example, the BTV stream 222 can include a multicast virtual local area network (VLAN) connection between the distribution switch/router system 228 and the access switch/router system 226. Each of the plurality of subscriber traffic streams 224 can be used to communicate subscriber specific data packets. For example, the first subscriber traffic stream can communicate data related to a first subscriber, and the nth subscriber traffic stream can communicate data related to an nth subscriber. Each subscriber to the system 200 can be associated with a respective subscriber traffic stream 224. The subscriber traffic stream 224 can include a subscriber VLAN connection between the distribution switch/router system 228 and the access switch/router system 226 that is associated with a particular set-top box device 204, 206, a particular residence 202, a particular residential gateway 214, another device associated with a subscriber, or any combination thereof.

In an illustrative embodiment, a set-top box device, such as the set-top box device 204, receives a channel change command from an input device, such as a remoter control device. The channel change command can indicate selection of an IPTV channel. After receiving the channel change command, the set-top box device 204 generates channel selection data that indicates the selection of the IPTV channel. The set-top box device 204 can send the channel selection data to the access switch/router system 226 via the residential gateway 214. The channel selection data can include an Internet Group Management Protocol (IGMP) Join request. In an illustrative embodiment, the access switch/router system 226 can identify whether it is joined to a multicast group associated with the requested channel based on information in the IGMP Join request.

If the access switch/router system 226 is not joined to the multicast group associated with the requested channel, the access switch/router system 226 can generate a multicast stream request. The multicast stream request can be generated by modifying the received channel selection data. In an illustrative embodiment, the access switch/router system 226 can modify an IGMP Join request to produce a proxy IGMP Join request. The access switch/router system 226 can send the multicast stream request to the distribution switch/router system 228 via the BTV stream 222. In response to receiving the multicast stream request, the distribution switch/router system 228 can send a stream associated with the requested channel to the access switch/router system 226 via the BTV stream 222.

The web server 130 of FIG. 1 can be operably coupled to the second communication system 200 for purposes similar to those described above.

Figure 3:
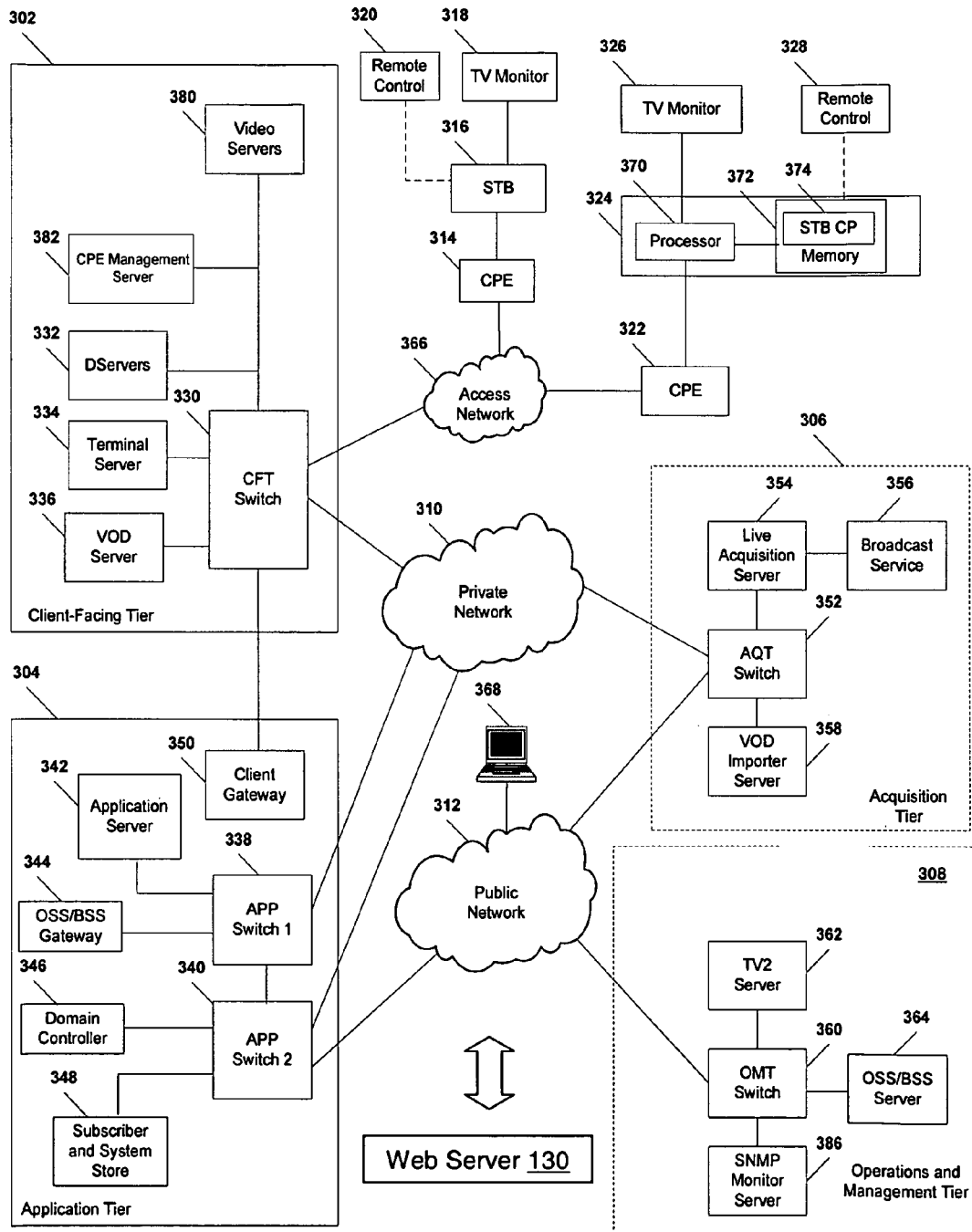

FIG. 3 depicts an illustrative embodiment of a third communication system 300 for delivering media content. Communication system 300 can be overlaid or operably coupled with communication systems 100-200 as another representative embodiment of said communication systems. As shown, the system 300 can include a client facing tier 302, an application tier 304, an acquisition tier 306, and an operations and management tier 308. Each tier 302, 304, 306, 308 is coupled to a private network 310, such as a network of common packet-switched routers and/or switches; to a public network 312, such as the Internet; or to both the private network 310 and the public network 312. For example, the client-facing tier 302 can be coupled to the private network 310. Further, the application tier 304 can be coupled to the private network 310 and to the public network 312. The acquisition tier 306 can also be coupled to the private network 310 and to the public network 312. Additionally, the operations and management tier 308 can be coupled to the public network 312.

As illustrated in FIG. 3, the various tiers 302, 304, 306, 308 communicate with each other via the private network 310 and the public network 312. For instance, the client-facing tier 302 can communicate with the application tier 304 and the acquisition tier 306 via the private network 310. The application tier 304 can communicate with the acquisition tier 306 via the private network 310. Further, the application tier 304 can communicate with the acquisition tier 306 and the operations and management tier 308 via the public network 312. Moreover, the acquisition tier 306 can communicate with the operations and management tier 308 via the public network 312. In a particular embodiment, elements of the application tier 304, including, but not limited to, a client gateway 350, can communicate directly with the client-facing tier 302.

The client-facing tier 302 can communicate with user equipment via an access network 366, such as an IPTV access network. In an illustrative embodiment, customer premises equipment (CPE) 314, 322 can be coupled to a local switch, router, or other device of the access network 366. The client-facing tier 302 can communicate with a first representative set-top box device 316 via the first CPE 314 and with a second representative set-top box device 324 via the second CPE 322. In a particular embodiment, the first representative set-top box device 316 and the first CPE 314 can be located at a first customer premise, and the second representative set-top box device 324 and the second CPE 322 can be located at a second customer premise.

In another particular embodiment, the first representative set-top box device 316 and the second representative set-top box device 324 can be located at a single customer premise, both coupled to one of the CPE 314, 322. The CPE 314, 322 can include routers, local area network devices, modems, such as digital subscriber line (DSL) modems, any other suitable devices for facilitating communication between a set-top box device and the access network 366, or any combination thereof.

In an illustrative embodiment, the client-facing tier 302 can be coupled to the CPE 314, 322 via fiber optic cables. In another illustrative embodiment, the CPE 314, 322 can include DSL modems that are coupled to one or more network nodes via twisted pairs, and the client-facing tier 302 can be coupled to the network nodes via fiber-optic cables. Each set-top box device 316, 324 can process data received via the access network 366, via a common IPTV software platform.

The first set-top box device 316 can be coupled to a first external display device, such as a first television monitor 318, and the second set-top box device 324 can be coupled to a second external display device, such as a second television monitor 326. Moreover, the first set-top box device 316 can communicate with a first remote control 320, and the second set-top box device 324 can communicate with a second remote control 328. The set-top box devices 316, 324 can include IPTV set-top box devices; video gaming devices or consoles that are adapted to receive IPTV content; personal computers or other computing devices that are adapted to emulate set-top box device functionalities; any other device adapted to receive IPTV content and transmit data to an IPTV system via an access network; or any combination thereof.

In an illustrative, non-limiting embodiment, each set-top box device 316, 324 can receive data, video, or any combination thereof, from the client-facing tier 302 via the access network 366 and render or display the data, video, or any combination thereof, at the display device 318, 326 to which it is coupled. In an illustrative embodiment, the set-top box devices 316, 324 can include tuners that receive and decode television programming signals or packet streams for transmission to the display devices 318, 326. Further, the set-top box devices 316, 324 can each include a STB processor 370 and a STB memory device 372 that is accessible to the STB processor 370. In one embodiment, a computer program, such as the STB computer program 374, can be embedded within the STB memory device 372.

In an illustrative embodiment, the client-facing tier 302 can include a client-facing tier (CFT) switch 330 that manages communication between the client-facing tier 302 and the access network 366 and between the client-facing tier 302 and the private network 310. As illustrated, the CFT switch 330 is coupled to one or more distribution servers, such as Distribution-servers (D-servers) 332, that store, format, encode, replicate, or otherwise manipulate or prepare video content for communication from the client-facing tier 302 to the set-top box devices 316, 324. The CFT switch 330 can also be coupled to a terminal server 334 that provides terminal devices with a point of connection to the IPTV system 300 via the client-facing tier 302.

In a particular embodiment, the CFT switch 330 can be coupled to a VoD server 336 that stores or provides VoD content imported by the IPTV system 300. Further, the CFT switch 330 is coupled to one or more video servers 380 that receive video content and transmit the content to the set-top boxes 316, 324 via the access network 366. The client-facing tier 302 may include a CPE management server 382 that manages communications to and from the CPE 314 and the CPE 322. For example, the CPE management server 382 may collect performance data associated with the set-top box devices 316, 324 from the CPE 314 or the CPE 322 and forward the collected performance data to a server associated with the operations and management tier 308.

In an illustrative embodiment, the client-facing tier 302 can communicate with a large number of set-top boxes, such as the representative set-top boxes 316, 324, over a wide geographic area, such as a metropolitan area, a viewing area, a statewide area, a regional area, a nationwide area or any other suitable geographic area, market area, or subscriber or customer group that can be supported by networking the client-facing tier 302 to numerous set-top box devices. In a particular embodiment, the CFT switch 330, or any portion thereof, can include a multicast router or switch that communicates with multiple set-top box devices via a multicast-enabled network.

As illustrated in FIG. 3, the application tier 304 can communicate with both the private network 310 and the public network 312. The application tier 304 can include a first application tier (APP) switch 338 and a second APP switch 340. In a particular embodiment, the first APP switch 338 can be coupled to the second APP switch 340. The first APP switch 338 can be coupled to an application server 342 and to an OSS/BSS gateway 344. In a particular embodiment, the application server 342 can provide applications to the set-top box devices 316, 324 via the access network 366, which enable the set-top box devices 316, 324 to provide functions, such as interactive program guides, video gaming, display, messaging, processing of VoD material and other IPTV content, etc. In an illustrative embodiment, the application server 342 can provide location information to the set-top box devices 316, 324. In a particular embodiment, the OSS/BSS gateway 344 includes operation systems and support (OSS) data, as well as billing systems and support (BSS) data. In one embodiment, the OSS/BSS gateway 344 can provide or restrict access to an OSS/BSS server 364 that stores operations and billing systems data.

The second APP switch 340 can be coupled to a domain controller 346 that provides Internet access, for example, to users at their computers 368 via the public network 312. For example, the domain controller 346 can provide remote Internet access to IPTV account information, e-mail, personalized Internet services, or other online services via the public network 312. In addition, the second APP switch 340 can be coupled to a subscriber and system store 348 that includes account information, such as account information that is associated with users who access the IPTV system 300 via the private network 310 or the public network 312. In an illustrative embodiment, the subscriber and system store 348 can store subscriber or customer data and create subscriber or customer profiles that are associated with IP addresses, stock-keeping unit (SKU) numbers, other identifiers, or any combination thereof, of corresponding set-top box devices 316, 324. In another illustrative embodiment, the subscriber and system store can store data associated with capabilities of set-top box devices associated with particular customers.

In a particular embodiment, the application tier 304 can include a client gateway 350 that communicates data directly to the client-facing tier 302. In this embodiment, the client gateway 350 can be coupled directly to the CFT switch 330. The client gateway 350 can provide user access to the private network 310 and the tiers coupled thereto. In an illustrative embodiment, the set-top box devices 316, 324 can access the IPTV system 300 via the access network 366, using information received from the client gateway 350. User devices can access the client gateway 350 via the access network 366, and the client gateway 350 can allow such devices to access the private network 310 once the devices are authenticated or verified. Similarly, the client gateway 350 can prevent unauthorized devices, such as hacker computers or stolen set-top box devices from accessing the private network 310, by denying access to these devices beyond the access network 366.

For example, when the first representative set-top box device 316 accesses the client-facing tier 302 via the access network 366, the client gateway 350 can verify subscriber information by communicating with the subscriber and system store 348 via the private network 310. Further, the client gateway 350 can verify billing information and status by communicating with the OSS/BSS gateway 344 via the private network 310. In one embodiment, the OSS/BSS gateway 344 can transmit a query via the public network 312 to the OSS/BSS server 364. After the client gateway 350 confirms subscriber and/or billing information, the client gateway 350 can allow the set-top box device 316 to access IPTV content and VoD content at the client-facing tier 302. If the client gateway 350 cannot verify subscriber information for the set-top box device 316, e.g., because it is connected to an unauthorized twisted pair, the client gateway 350 can block transmissions to and from the set-top box device 316 beyond the access network 366.

As indicated in FIG. 3, the acquisition tier 306 includes an acquisition tier (AQT) switch 352 that communicates with the private network 310. The AQT switch 352 can also communicate with the operations and management tier 308 via the public network 312. In a particular embodiment, the AQT switch 352 can be coupled to one or more live Acquisition-servers (A-servers) 354 that receive or acquire television content, movie content, advertisement content, other video content, or any combination thereof, from a broadcast service 356, such as a satellite acquisition system or satellite headend office. In a particular embodiment, the live acquisition server 354 can transmit content to the AQT switch 352, and the AQT switch 352 can transmit the content to the CFT switch 330 via the private network 310.

In an illustrative embodiment, content can be transmitted to the D-servers 332, where it can be encoded, formatted, stored, replicated, or otherwise manipulated and prepared for communication from the video server(s) 380 to the set-top box devices 316, 324. The CFT switch 330 can receive content from the video server(s) 380 and communicate the content to the CPE 314, 322 via the access network 366. The set-top box devices 316, 324 can receive the content via the CPE 314, 322, and can transmit the content to the television monitors 318, 326. In an illustrative embodiment, video or audio portions of the content can be streamed to the set-top box devices 316, 324.

Further, the AQT switch 352 can be coupled to a video-on-demand importer server 358 that receives and stores television or movie content received at the acquisition tier 306 and communicates the stored content to the VoD server 336 at the client-facing tier 302 via the private network 310. Additionally, at the acquisition tier 306, the VoD importer server 358 can receive content from one or more VoD sources outside the IPTV system 300, such as movie studios and programmers of non-live content. The VoD importer server 358 can transmit the VoD content to the AQT switch 352, and the AQT switch 352, in turn, can communicate the material to the CFT switch 330 via the private network 310. The VoD content can be stored at one or more servers, such as the VoD server 336.

When users issue requests for VoD content via the set-top box devices 316, 324, the requests can be transmitted over the access network 366 to the VoD server 336, via the CFT switch 330. Upon receiving such requests, the VoD server 336 can retrieve the requested VoD content and transmit the content to the set-top box devices 316, 324 across the access network 366, via the CFT switch 330. The set-top box devices 316, 324 can transmit the VoD content to the television monitors 318, 326. In an illustrative embodiment, video or audio portions of VoD content can be streamed to the set-top box devices 316, 324.

FIG. 3 further illustrates that the operations and management tier 308 can include an operations and management tier (OMT) switch 360 that conducts communication between the operations and management tier 308 and the public network 312. In the embodiment illustrated by FIG. 3, the OMT switch 360 is coupled to a TV2 server 362. Additionally, the OMT switch 360 can be coupled to an OSS/BSS server 364 and to a simple network management protocol monitor 386 that monitors network devices within or coupled to the IPTV system 300. In a particular embodiment, the OMT switch 360 can communicate with the AQT switch 352 via the public network 312.

The OSS/BSS server 364 may include a cluster of servers, such as one or more CPE data collection servers that are adapted to request and store operations systems data, such as performance data from the set-top box devices 316, 324. In an illustrative embodiment, the CPE data collection servers may be adapted to analyze performance data to identify a condition of a physical component of a network path associated with a set-top box device, to predict a condition of a physical component of a network path associated with a set-top box device, or any combination thereof.

In an illustrative embodiment, the live acquisition server 354 can transmit content to the AQT switch 352, and the AQT switch 352, in turn, can transmit the content to the OMT switch 360 via the public network 312. In this embodiment, the OMT switch 360 can transmit the content to the TV2 server 362 for display to users accessing the user interface at the TV2 server 362. For example, a user can access the TV2 server 362 using a personal computer 368 coupled to the public network 312.

The web server 130 of FIG. 1 can be operably coupled to the third communication system 300 for purposes similar to those described above.

It should be apparent to one of ordinary skill in the art from the foregoing media communication system embodiments that other suitable media communication systems for distributing broadcast media content as well as peer-to-peer exchange of content can be applied to the present disclosure.

Figure 4:
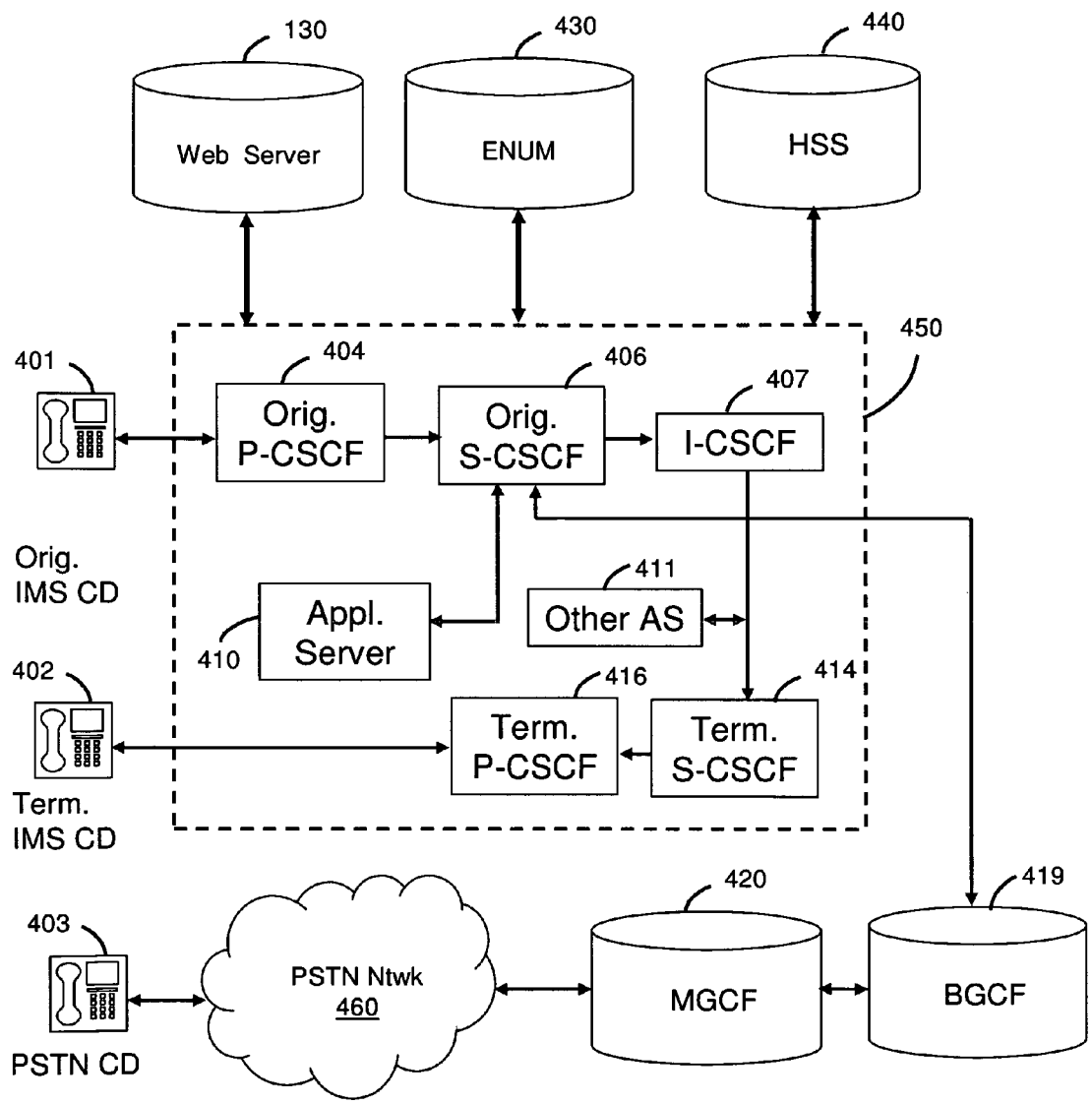

FIG. 4 depicts an illustrative embodiment of a communication system 400 employing an IP Multimedia Subsystem (IMS) network architecture. Communication system 400 can be overlaid or operably coupled with communication systems 100-300 as another representative embodiment of said communication systems.

The communication system 400 can comprise a Home Subscriber Server (HSS) 440, a tElephone NUmber Mapping (ENUM) server 430, and network elements of an IMS network 450. The IMS network 450 can be coupled to IMS compliant communication devices (CD) 401, 402 or a Public Switched Telephone Network (PSTN) CD 403 using a Media Gateway Control Function (MGCF) 420 that connects the call through a common PSTN network 460.

IMS CDs 401, 402 register with the IMS network 450 by contacting a Proxy Call Session Control Function (P-CSCF) which communicates with a corresponding Serving CSCF (S-CSCF) to register the CDs with an Authentication, Authorization and Accounting (AAA) supported by the HSS 440. To accomplish a communication session between CDs, an originating IMS CD 401 can submit a Session Initiation Protocol (SIP INVITE) message to an originating P-CSCF 404 which communicates with a corresponding originating S-CSCF 406. The originating S-CSCF 406 can submit the SIP INVITE message to an application server (AS) such as reference 410 that can provide a variety of services to IMS subscribers. For example, the application server 410 can be used to perform originating treatment functions on the calling party number received by the originating S-CSCF 406 in the SIP INVITE message.

Originating treatment functions can include determining whether the calling party number has international calling services, and/or is requesting special telephony features (e.g., *72 forward calls, *73 cancel call forwarding, *67 for caller ID blocking, and so on). Additionally, the originating S-CSCF 406 can submit queries to the ENUM system 430 to translate an E.164 telephone number to a SIP Uniform Resource Identifier (URI) if the targeted communication device is IMS compliant. If the targeted communication device is a PSTN device, the ENUM system 430 will respond with an unsuccessful address resolution and the S-CSCF 406 will forward the call to the MGCF 420 via a Breakout Gateway Control Function (BGCF) 419.

When the ENUM server 430 returns a SIP URI, the SIP URI is used by an Interrogating CSCF (I-CSCF) 407 to submit a query to the HSS 440 to identify a terminating S-CSCF 414 associated with a terminating IMS CD such as reference 402. Once identified, the I-CSCF 407 can submit the SIP INVITE to the terminating S-CSCF 414 which can call on an application server 411 similar to reference 410 to perform the originating treatment telephony functions described earlier. The terminating S-CSCF 414 can then identify a terminating P-CSCF 416 associated with the terminating CD 402. The P-CSCF 416 then signals the CD 402 to establish communications. The aforementioned process is symmetrical. Accordingly, the terms "originating" and "terminating" in FIG. 4 can be interchanged.

IMS network 450 can also be operably coupled to the web server 130 previously discussed for FIG. 1. In this representative embodiment, the web server 130 can be accessed over a PSTN or VoIP channel of communication system 400 by common techniques such as described above.

Figure 5:
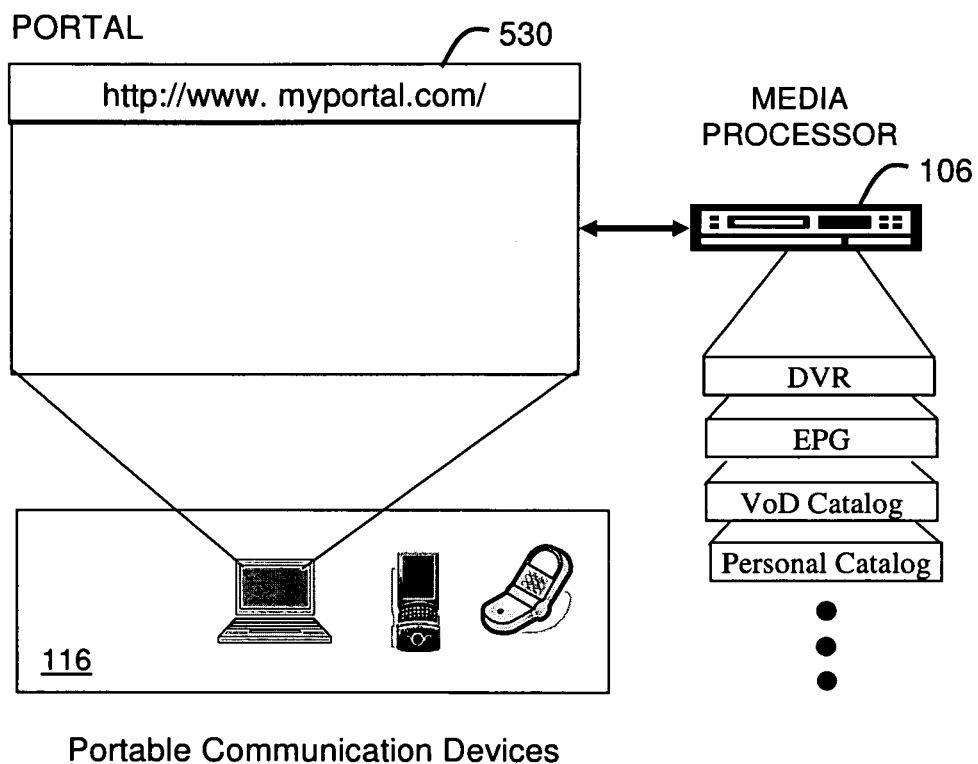
FIG. 5 depicts an illustrative embodiment of a portal interacting with at least one among the communication systems of FIGS. 1-4.

FIG. 5 depicts an illustrative embodiment of a portal 530. The portal 530 can be used for managing services of communication systems 100-400. The portal 530 can be accessed by a Uniform Resource Locator (URL) with a common Internet browser such as Microsoft's Internet Explorer using an Internet-capable communication device such as references 108, 116, or 210 of FIGS. 1-2. The portal 530 can be configured to access a media processor such as references 106, 204, 206, 316, and 324 of FIGS. 1-3 and services managed thereby such as a Digital Video Recorder (DVR), an Electronic Programming Guide (EPG), VoD catalog, a personal catalog stored in the STB (e.g., personal videos, pictures, audio recordings, etc.), and so on.

Figure 6:
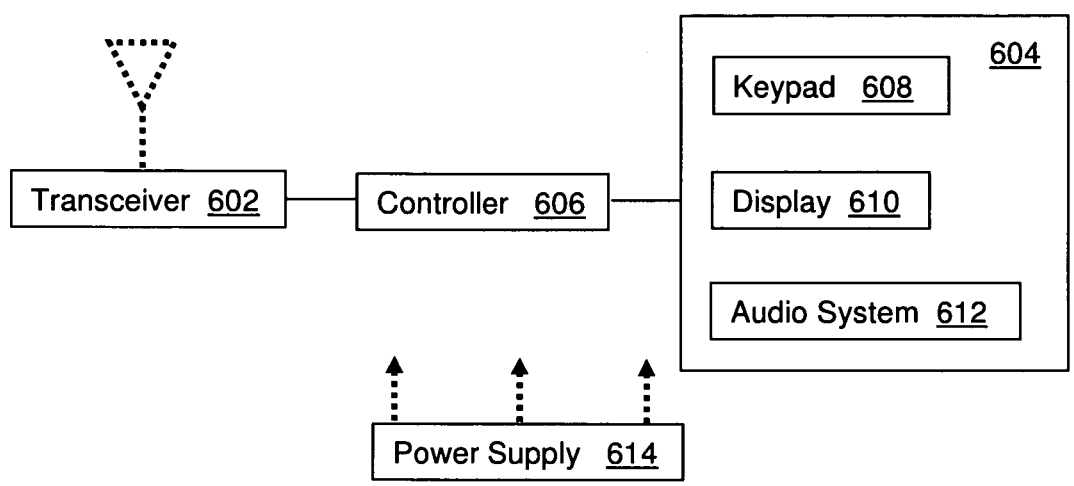
FIG. 6 depicts an illustrative embodiment of a communication device utilized in the communication systems of FIGS. 1-4.

FIG. 6 depicts an exemplary embodiment of a communication device 600. Communication device 600 can be a representative portion of any of the aforementioned communication devices of FIGS. 1-4. The communication device 604 can comprise a wireline and/or wireless transceiver 602 (herein transceiver 602), a user interface (UI) 604, a power supply 614, and a controller 606 for managing operations thereof. The transceiver 602 can support short-range or long-range wireless access technologies such as a Bluetooth wireless access protocol, a Wireless Fidelity (WiFi) access protocol, a Digital Enhanced Cordless Telecommunications (DECT) wireless access protocol, cellular, software defined radio (SDR) and/or WiMAX technologies, just to mention a few. Cellular technologies can include, for example, CDMA-LX, UMTS/HSDPA, GSM/GPRS, TDMA/EDGE, EV/DO, and next generation technologies as they arise.

The transceiver 602 can also support common wireline access technologies such as circuit-switched wireline access technologies, packet-switched wireline access technologies, or combinations thereof. PSTN can represent one of the common circuit-switched wireline access technologies. Voice over Internet Protocol (VoIP), and IP data communications can represent some of the commonly available packet-switched wireline access technologies. The transceiver 602 can also be adapted to support IP Multimedia Subsystem (IMS) protocol for interfacing to an IMS network that can combine PSTN and VoIP communication technologies.

The UI 604 can include a depressible or touch-sensitive keypad 608 and a navigation mechanism such as a roller ball, joystick, mouse, and/or navigation disk for manipulating operations of the communication device 600. The keypad 608 can be an integral part of a housing assembly of the communication device 600 or an independent device operably coupled thereto by a tethered wiring interface (e.g., USB) or a wireless interface supporting for example Bluetooth. The keypad 608 can represent a numeric dialing keypad commonly used by phones, and/or a Qwerty keypad with alphanumeric keys.

The UI 604 can further include a display 610 such as monochrome or color LCD (Liquid Crystal Display), OLED (Organic Light Emitting Diode) or other suitable display technology for conveying images to the end user of the communication device 600. In an embodiment where the display 610 is touch-sensitive, a portion or all of the keypad 608 can be presented by way of the display. The UI 604 can also include an audio system 612 that utilizes common audio technology for conveying low volume audio (e.g., audio heard only in the proximity of a human ear) and high volume audio (e.g., speakerphone for hands free operation). The audio system 612 can further include a microphone for receiving audible signals of an end user.

The power supply 614 can utilize common power management technologies such as replaceable and rechargeable batteries, supply regulation technologies, and charging system technologies for supplying energy to the components of the communication device 600 to facilitate long-range or short-range portable applications. The controller 606 can utilize computing technologies such as a microprocessor and/or digital signal processor (DSP) with associated storage memory such a Flash, ROM, RAM, SRAM, DRAM or other storage technologies.

Figure 7:
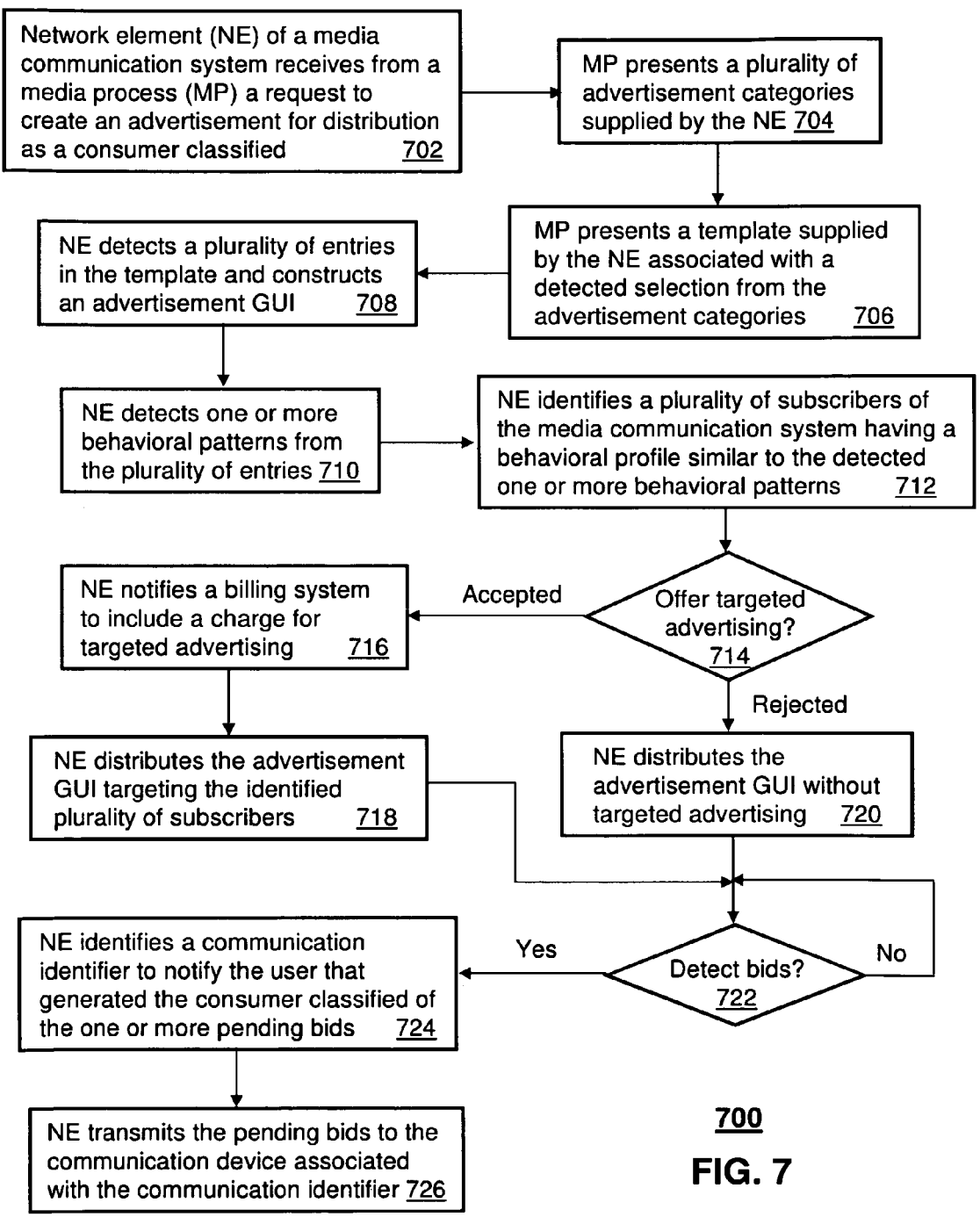
FIG. 7 depicts an illustrative embodiment of a method operating in portions of the communication systems of FIGS. 1-4.

FIG. 7 depicts an illustrative method 700 operating in portions of communication systems 100-400. FIGS. 9-13 depicts illustrative embodiments of method 700. Method 700 can begin with step 702 in which a network element of a media communication system such as an interactive television system (iTV) described in FIGS. 1-3 and/or an IMS system described in FIG. 4 receives from a media processor a request to create an advertisement for distribution as a consumer classified. The media processor can represent an STB, a computer terminal, a cellular phone, short-range fixed-line phone terminal such as a cordless IMS phone, or any other communication device suitable for operation under the present disclosure. The network element can be an independently operated system such as web server 130, or a system with the resources of a web server which is an integral part of the media processor.

Figure 8:
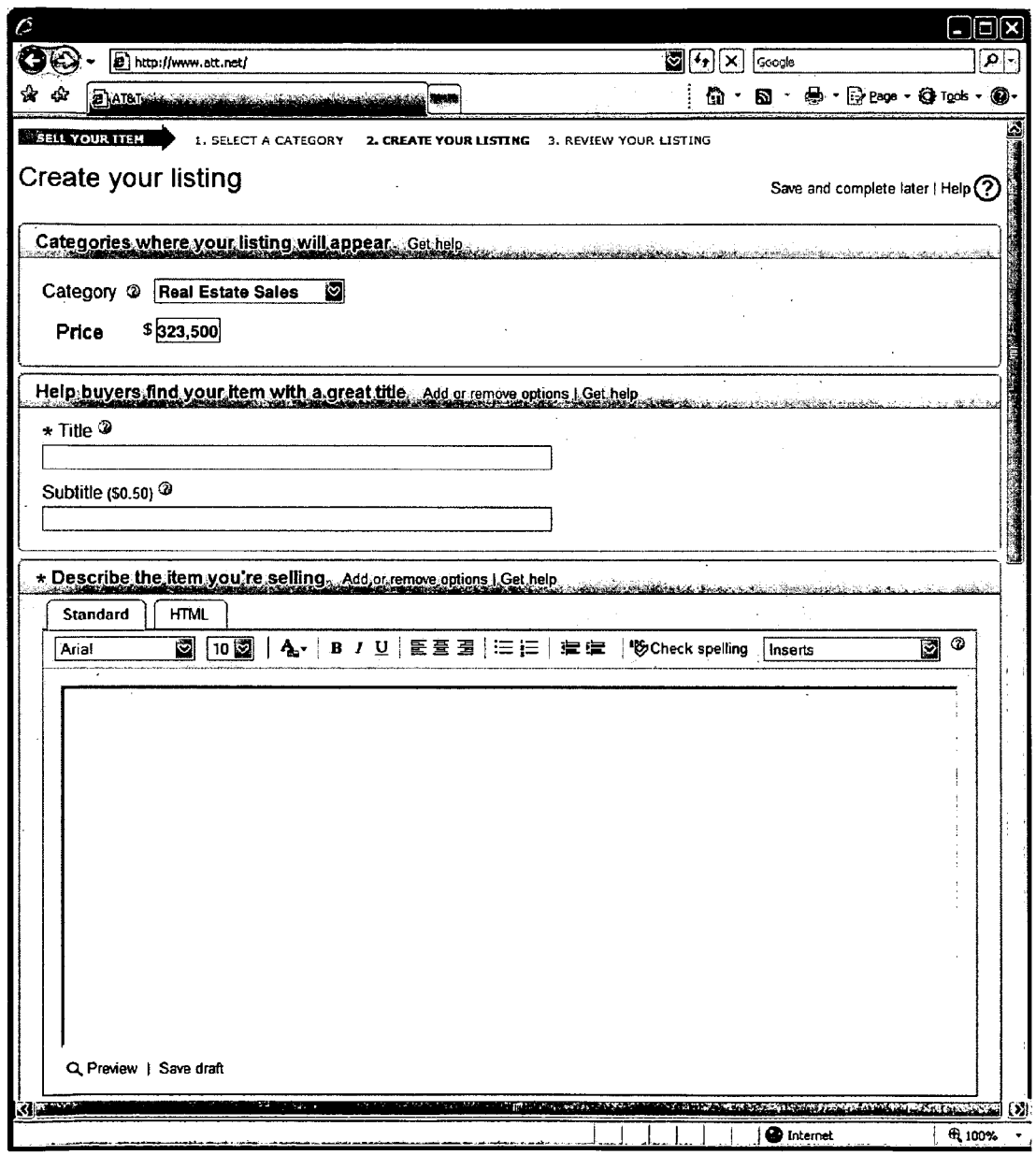
FIGS. 8-13 depicts illustrative embodiments of the method of FIG. 7.
Figure 9:
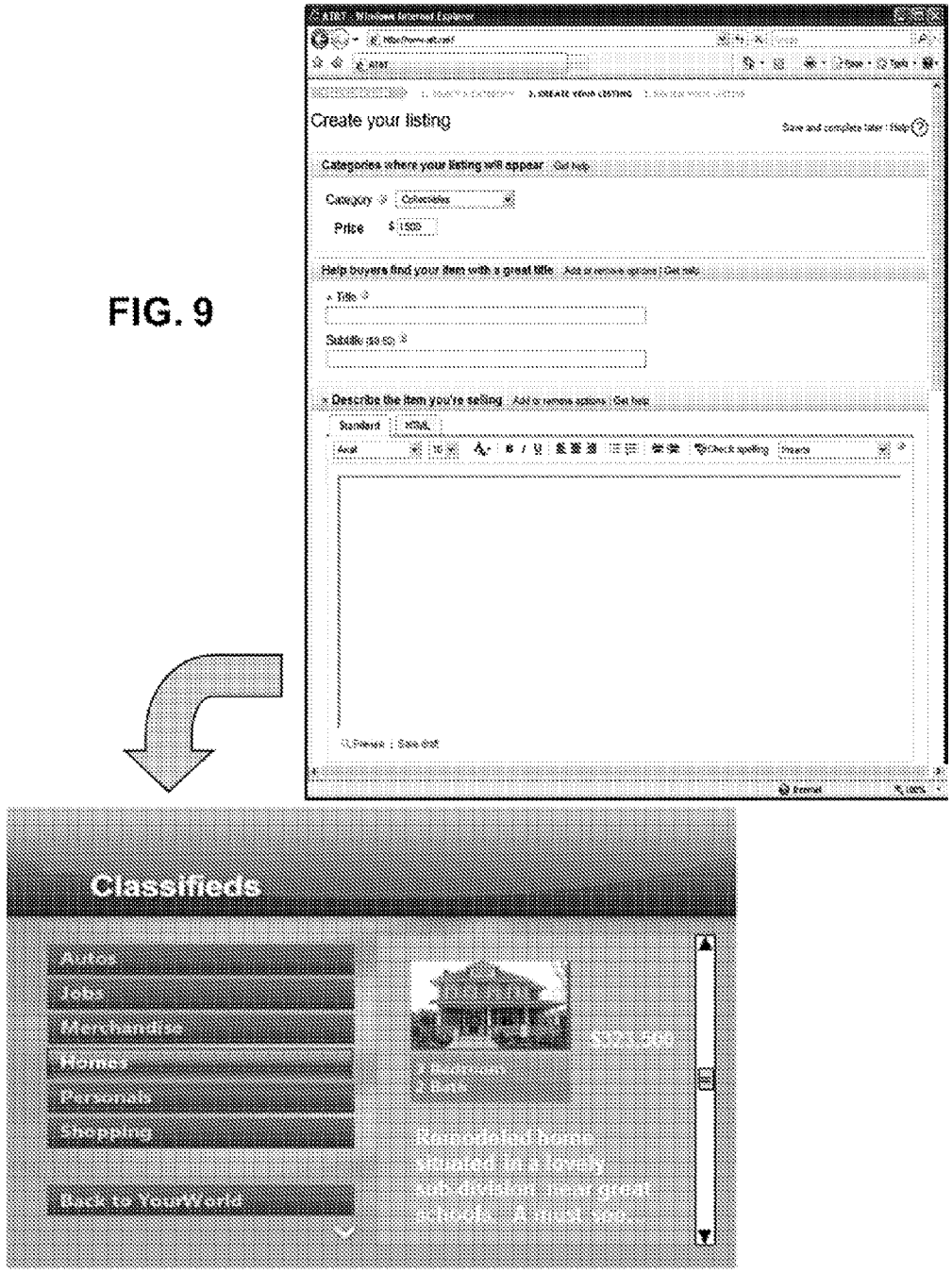

Assuming the former for illustrative purposes only, the media processor can present in step 704 a plurality of selectable advertisement categories supplied by the web server 130 responsive to the request of step 702. In step 706, the media processor can present an advertisement template (such as shown in FIG. 8) supplied by the web server 130 for entering consumer classified information. The advertisement template can include a common HyperText Markup Language (HTML) editor which provides the user a means to enter in the advertisement template any form of media content (e.g., audio content, video content, still image content or combinations), text, hypertext links to other webpages, metadata descriptive of the product or service sold and/or distributed, or combinations thereof, which are detectable by the web server 130 in step 708. While entering content in the advertisement template, the user can also select a preview button to preview an advertisement graphical user interface (GUI) that would be displayed to potential consumers based on said entries-see FIG. 9. It will be appreciated that other present, next generation, or proprietary mark-up languages for editing webpages can be applied to the present disclosure.

From the entries made in the advertisement template, the web server 130 can detect in step 710 one or more behavioral patterns. The behavioral patterns can represent for example a demographic and/or a psychographic profile of the content supplied in the template. From these patterns, the web server 130 can identify in step 712 a plurality of subscribers of the media communication systems 100-400 of FIGS. 1-4 that have similar or matching behaviors. The web server 130 can make this determination from behavioral modeling that can be performed by the media communication systems 100 using common techniques. For instance, behavior modeling can be determined on a per subscriber basis by monitoring consumption behaviors (TV channels watched, audio content consumed, movies downloaded, goods or services purchased, etc.). Behavior modeling can also be determined from subscriber account information (e.g., age of subscriber, gender, residential address, services subscribed, and so on). Behavioral modeling of subscribers can also be determined from what subscribers choose not to do (e.g., what products were requested but not consumed. Behavior modeling of subscribers can also be determined from usage data analyzed from other communication devices of the subscribers (e.g., mobile phones, computers, etc.). Collectively, the media communication systems 100-400 can identify demographic and/or psychographic segments of its subscriber population. With access to this information, the web server 130 can perform targeted advertising.

Accordingly, the web sever 130 can offer the user promoting the good or service identified in the advertisement template a means to perform targeted advertising. If the user accepts the offer in step 714, the web server 130 can proceed to step 716 where it notifies a billing system to include a charge for targeted advertising. The fee can be a one-time charge, part of bundled service charges, or a recurring charge while the advertisement GUI is in distribution. In step 718, the web server 130 can distribute the advertisement GUI constructed in step 708 by targeting the identified plurality of subscribers. This step can represent email distributions to said subscribers, raising a listing priority of the goods or services sold (e.g., a preferred listing of a home sale), displaying prominent portions of the advertisement GUI while said subscribers browse through media content, web pages, or other content sources.

If the user generating the consumer advertisement chooses not to use the targeted advertising feature, the web server 130 can proceed to step 720 where it distributes the advertisement GUI to a general population of subscribers without proactively targeting a portion of said subscribers having similar interests. A general distribution of the advertisement GUI can take place by way of portal 530 as previously described, in which case, viewing of the advertisement GUI can occur when consumers proactively searched the portal for specific goods or services.

Figure 10:
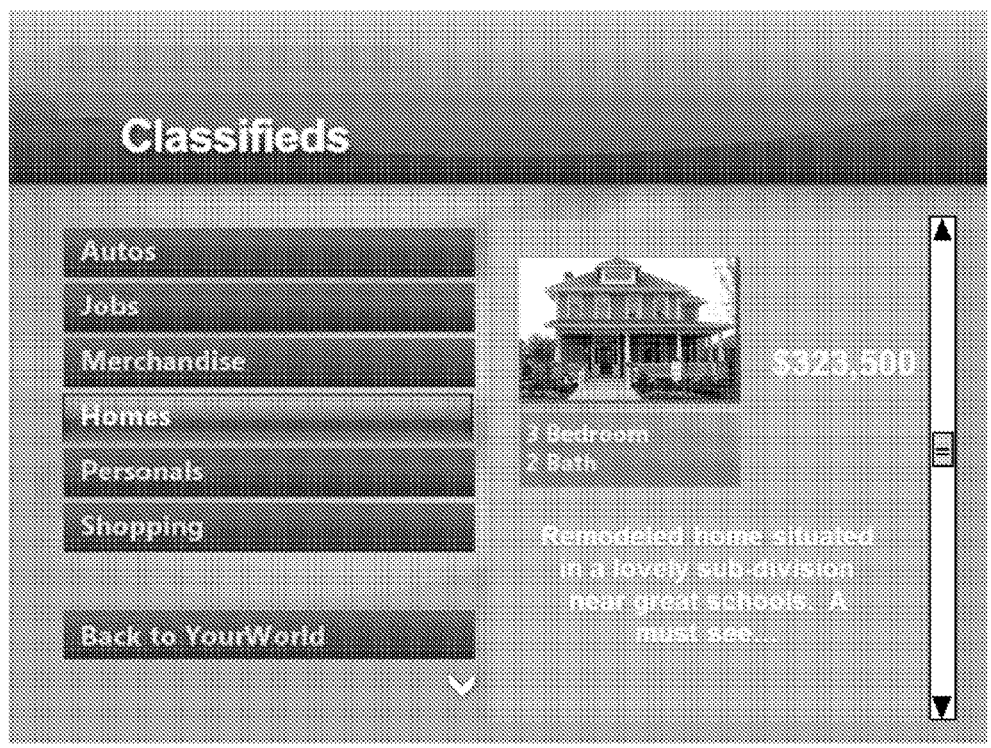
Figure 11:

In either the case of targeted advertising or passive advertising, the subscribers of the media communication systems 100-400 can view said advertising by way of a media presentation device operably coupled to an STB, a computer terminal, a cordless IMS phone with a large display, an Internet-capable cellular phone, or any other communication device with Internet access and browsing capability. FIG. 10 provides an illustrative embodiment of what a subscriber viewing a portion of advertisement GUI created in step 708 can see. FIG. 11 illustrates an embodiment of a search GUI which the web server 130 can present a subscriber when searching for homes for sale. The search data entered by subscribers can be used to search through metadata inserted in the advertisement GUIs. Matches or nearly matches can be presented by the web server 130 as shown in FIG. 12.

Figure 12:
Figure 13:
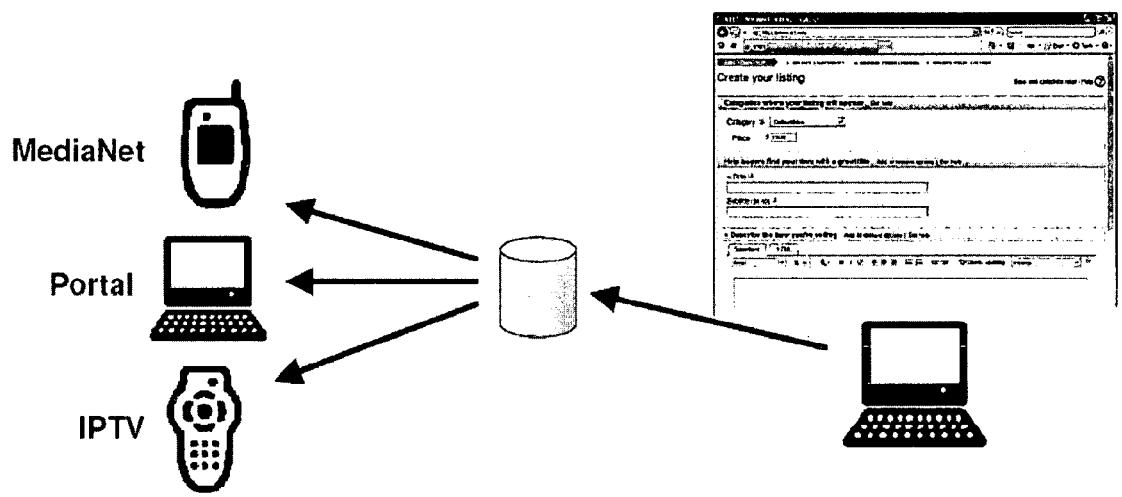

In the case of targeted advertising, the web server 130 can intentionally list a consumer advertising GUI with preference over other home sales as indicated by the "starred" listings shown in FIG. 12. This preference can override mismatches such as in the present case where the home listed on "1405 Holly Branch Way" is a 3 bedroom 2 bath at $323,500, while the search pattern required a 5 bedroom 3 bath home not exceeding $300,000.

There can be instances when the user that generated the advertisement GUI intends to accept bids for the product or service advertised. When auctioning is enabled (as a feature while constructing the advertisement GUI in step 708), the web server 130 can monitor bids in step 722. If bids are detected, the web server 130 can proceed to step 724 and identify a communication identifier of a communication device of the user that generated the advertisement to communicate said bids. The communication identifier can be a SIP URI or E.164 number such as previously described, an identifier of an STB (e.g., static IP address, MAC address), an email address, a short messaging service (SMS) address, a multimedia messaging service (MMS) address, or any other suitable communication identifier that identifies a target communication device for conveying bids to the user that generated the advertisement.

The communication identifier can be supplied as one of the entries detected in step 708. With the communication identifier, the web server 130 can transmit the pending bids to the communication device associated with the communication identifier, and can process responses (e.g., acceptance, rejection, counteroffer) from the user that generated the advertisement. The responses (not shown) can be conveyed to the bidders to further the auctioning process.

Upon reviewing the aforementioned embodiments, it would be evident to an artisan with ordinary skill in the art that said embodiments can be modified, reduced, or enhanced without departing from the scope and spirit of the claims described below. For example, method 700 can be adapted so that any form of consumer advertising is possible. For instance, method 700 can be applied to automobile sales, consumer product sales, lawn services offered by children in a family, and so on.

Additionally, method 700 can be adapted so that the advertisement GUI generated in step 708 can target subscriber devices operating in disparate networks (e.g., Internet-capable cellular network, portal, media communication system, etc.). The web server 130 can be adapted to adjust the advertisement GUI created in step 708 so that it is suitable for viewing at communication devices with differing presentation resources (e.g., high resolution advertisement GUI for a high definition STB, standard resolution advertisement GUI for a portal, low resolution and small display advertisement GUI for mobile phones). Additionally, the web server 130 can be adapted to present preview screens of the advertisement GUIs as it would be viewed on disparate presentation devices.

In yet another embodiment, step 712 can be supplemented or replaced with other subscriber targeting techniques. For instance, the user generating the advertisement can provide recommendations for targeted advertising such as by identifying specific subscriber(s) of the media communication systems of FIGS. 1-4 to be targeted by the advertisements. The service provider of the media communication systems 100-400 can also specify rules to be used for targeted advertising. For example, the service provider can offer an opt-out service to subscribers who want to maintain their privacy and do not want to be targeted by advertisements.

In another embodiment, step 710 can be replaced or supplemented by detecting demographic patterns from other sources of demographic data associated with the user. The other sources of demographic data can correspond to usage behavior data collected from one or more communication devices (e.g., mobile phone, computer, etc.) of the user, usage behavior data collected from subscriber account information of the user, and/or usage behavior data collected from user preferences supplied by the user Other suitable modifications can be applied to the present disclosure without departing from the scope of the claims below. Accordingly, the reader is directed to the claims section for a fuller understanding of the breadth and scope of the present disclosure.

Figure 14:
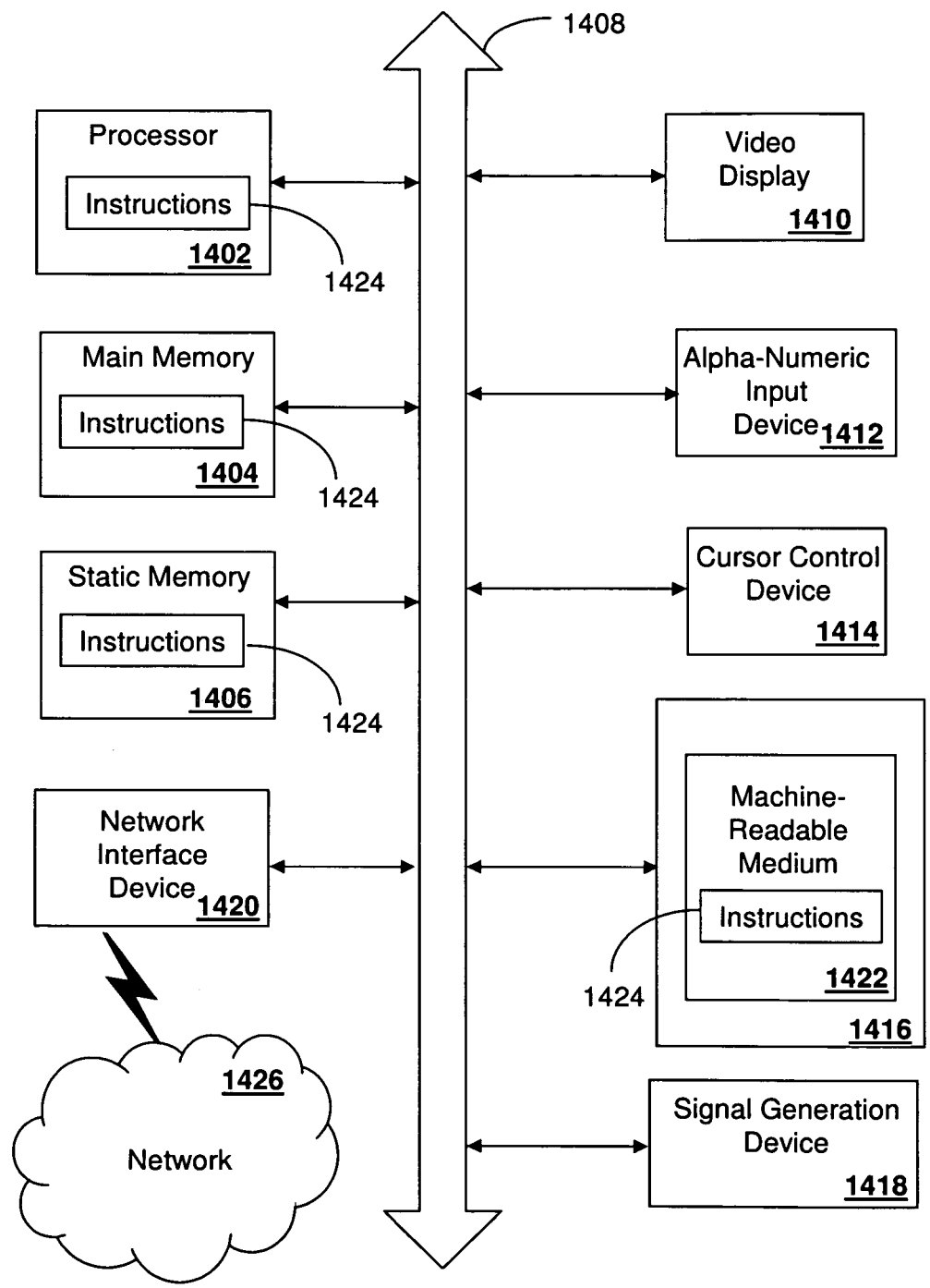
FIG. 14 is a diagrammatic representation of a machine in the form of a computer system within which a set of instructions, when executed, may cause the machine to perform any one or more of the methodologies discussed herein.

FIG. 14 depicts an exemplary diagrammatic representation of a machine in the form of a computer system 1400 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 1400 may include a processor 1402 (e.g., a central processing unit (CPU), a graphics processing unit (GPU, or both), a main memory 1404 and a static memory 1406, which communicate with each other via a bus 1408. The computer system 1400 may further include a video display unit 1410 (e.g., a liquid crystal display (LCD), a flat panel, a solid state display, or a cathode ray tube (CRT)). The computer system 1400 may include an input device 1412 (e.g., a keyboard), a cursor control device 1414 (e.g., a mouse), a disk drive unit 1416, a signal generation device 1418 (e.g., a speaker or remote control) and a network interface device 1420.

The disk drive unit 1416 may include a machine-readable medium 1422 on which is stored one or more sets of instructions (e.g., software 1424) embodying any one or more of the methodologies or functions described herein, including those methods illustrated above. The instructions 1424 may also reside, completely or at least partially, within the main memory 1404, the static memory 1406, and/or within the processor 1402 during execution thereof by the computer system 1400. The main memory 1404 and the processor 1402 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 1424, or that which receives and executes instructions 1424 from a propagated signal so that a device connected to a network environment 1426 can send or receive voice, video or data, and to communicate over the network 1426 using the instructions 1424. The instructions 1424 may further be transmitted or received over a network 1426 via the network interface device 1420.

While the machine-readable medium 1422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A set-top box, comprising:
   a memory having computer instructions; and
   a controller device coupled to the memory, wherein the controller device when executing the computer instructions performs operations comprising:
   presenting a plurality of advertisement categories;
   detecting a selection of a selected one of the plurality of advertisement categories;
   presenting an advertisement template associated with the selected one of the plurality of advertisement categories;
   detecting a plurality of entries in the advertisement template for constructing a consumer classified advertisement;
   generating an advertisement graphical user interface corresponding to the entries;
   detecting a behavioral pattern from the plurality of entries detected in the advertisement template;
   identifying a plurality of targeted users of a media communication system according to the behavioral pattern, wherein the controller device operates in the media communication system;
   presenting a plurality of previews of the advertisement graphical user interface, each of the plurality of previews differing from each other based on display characteristics corresponding to different computing devices;
   providing, to equipment of the plurality of targeted users of the media communication system, accessibility to the advertisement graphical user interface;
   presenting to the equipment of the plurality of targeted users an auctioning process for submitting bids for purchasing a good or a service presented in the advertisement graphical user interface;
   receiving a bid from equipment of a targeted user of the plurality of targeted users;
   determining an identifier of a user of the set top box that generated the consumer classified advertisement; and
   presenting the bid to equipment of the user of the set-top box that generated the consumer classified advertisement.

2. The set top box of claim 1, wherein the controller device when executing the computer instructions performs operations comprising notifying the equipment of the targeted user of the plurality of targeted users of the consumer classified advertisement, wherein the different computing devices comprise another set top box and a television.

3. The set top box of claim 1, wherein the controller device when executing the computer instructions performs operations comprising:
   presenting an offer to the equipment of the plurality of targeted users of the media communication system with the advertisement graphical user interface; and
   notifying a billing system responsive to detecting an affirmative acceptance of the offer.

4. The set top box of claim 1, wherein the bid is presented by way of a media presentation device operably coupled to the set top box.

5. The set top box of claim 1, wherein the determining of the identifier of the user of the set top box that generated the consumer classified advertisement corresponds to a communication identifier of a communication device of the user, and wherein the presenting of the bid at to the equipment of the user of the set-top box that generated the classified advertisement comprises transmitting the bid to the equipment of the user of the set top box that generated the classified advertisement according to the communication identifier.

6. The set top box of claim 5, wherein the communication identifier comprises one of an E.164 number or a session initiation protocol uniform resource identifier.

7. The set top box of claim 1, wherein the controller device when executing the computer instructions performs operations comprising:
   detecting one of a demographic pattern, a psychographic pattern, or a combination thereof with the plurality of entries;
   identifying the plurality of targeted users of the media communication system according to the one of the demographic pattern the psychographic pattern, or the combination thereof.

8. The set top box of claim 7, wherein each of the plurality of targeted users has a consumption behavioral profile that is similar to the one of the demographic pattern, the psychographic pattern, or the combination thereof.

9. The set top box of claim 1, wherein the media communication system monitors a consumption behavior of each of its users and determines therefrom a behavioral profile of its users.

10. The set top box of claim 1, wherein the media communication system corresponds to one of an internet protocol multimedia subsystem communication system, an internet protocol television communication system, a cable television communication system, a satellite television communication system, or combinations thereof.

11. A network element of a media communication system, comprising:
   a memory having computer instructions; and
   a controller device coupled to the memory, wherein the controller device when executing the computer instructions performs operations comprising:
      receiving from a media processor a request to advertise a good or a service of a user of the media processor;
      presenting the media processor with a plurality of advertisement categories;
      detecting from the media processor a selection of a selected one of the plurality of advertisement categories;
      presenting the media processor with an advertisement template associated with the selected one of the plurality of advertisement categories;
      detecting at the media processor a plurality of entries in the advertisement template;
      generating an advertisement user interface corresponding to the plurality of entries;
      detecting a behavioral pattern in one of the plurality of entries, other sources of behavioral data associated with the user, or a combination thereof;
      identifying a plurality of targeted subscribers of the media communication system with a behavioral profile similar to the behavioral pattern;
      providing a plurality of previews of the advertisement user interface for presentation by way of the media processor, each of the plurality of previews differing from each other based on display characteristics corresponding to different computing devices;
      distributing the advertisement user interface to equipment of the plurality of targeted subscribers;
      presenting to the equipment of the plurality of targeted subscribers an auctioning process for submitting bids for purchasing a good or a service presented in the advertisement user interface;
      receiving a bid from equipment of a subscriber of the plurality of targeted subscribers;
      receiving a communication identification of the media processor of a user that generated the advertisement user interface; and
      presenting the bid to the media processor of the user that generated the advertisement user interface.

12. The network element of claim 11, wherein the media processor comprises a set-top box, a computer terminal, a web server, or combinations thereof, and wherein the different computing devices comprise another set top box and a television.

13. The network element of claim 11, wherein the controller device when executing the computer instructions performs operations comprising distributing the advertisement user interface by providing passive accessibility to the advertisement user interface by way of a media processor of each of the plurality of targeted subscribers.

14. The network element of claim 11, wherein the controller device when executing the computer instructions performs operations comprising distributing the advertisement user interface by notifying the equipment of each of the plurality of targeted subscribers of a service or product offered in the advertisement user interface.

15. The network element of claim 11, wherein the controller device when executing the computer instructions performs operations comprising:
   presenting at the media processor an offer to equipment of target subscribers of the media communication system with the advertisement user interface; and
   recording a fee applied to a billing statement of the media processor responsive to detecting an affirmative acceptance of the offer.

16. The network element of claim 11, wherein the presenting of the bid to the media processor of the user that generated the advertisement user interface comprises presenting the bid by way of a media presentation device operably coupled to the media processor.

17. The network element of claim 11, wherein the communication identification of the media processor of the user that generated the advertisement user interface corresponds to a communication identifier of a communication device of the user that generated the advertisement user interface, wherein the presenting of the bid comprises transmitting the presentation of the bid to the communication device according to the communication identifier of the communication device of the user that generated the advertisement user interface, and wherein the communication identifier of the communication device of the user that generated the advertisement user interface comprises one of an E.164 number or a session initiation protocol uniform resource identifier.

18. The network element of claim 11, wherein the media communication system corresponds to an internet protocol multimedia subsystem communication system, an internet protocol television system communication system, a cable television communication system, a satellite television communication system, or combinations thereof, and wherein the plurality of entries comprises a link to another webpage user interface that includes one of media content, advertisements, or a combination thereof.

19. The network element of claim 11, wherein the other sources of behavioral data comprise one of usage behavior data collected from a communication device of a targeted subscriber of the plurality of targeted subscribers, usage behavior data collected from subscriber account information of the targeted subscriber of the plurality of targeted subscribers, usage behavior data collected from user preferences supplied by equipment of the targeted subscriber of the plurality of targeted subscribers, or a combination thereof.

20. A method comprising:

receiving by a network element comprising processor, a request to advertise a good or a service of a user of a media processor;

presenting, by the network element, a plurality of advertisement categories;

detecting, by the network element, a selection of a selected one of the plurality of advertisement categories;

presenting, by the network element, an advertisement template associated with the selected one of the plurality of advertisement categories;

generating, by the network element, an advertisement user interface corresponding to a plurality of entries detected at the media processor;

detecting, by the network element, a behavioral pattern in one of the plurality of entries, other sources of behavioral data associated with the user, or combinations thereof;

identifying, by the network element, a plurality of targeted subscribers of a media communication system with a behavioral profile similar to the behavioral pattern;

providing, by the network element, a plurality of previews of the advertisement user interface for presentation by way of the media processor, each of the plurality of previews differing from each other based on display characteristics corresponding to different computing devices;

distributing, by the network element, the advertisement user interface to equipment of the plurality of targeted subscribers;

presenting, by the network element, an auctioning process to the equipment of the plurality of targeted subscribers for submitting bids for purchasing a good or a service presented in the advertisement user interface;

receiving, by the network element, a bid from equipment of a subscriber of the plurality of targeted subscribers;

receiving, by the network element, a communication identification of the media processor of a user that generated the advertisement user interface; and presenting, by the network element, the bid to the media processor of the user that generated the advertisement user interface.

21. The method of claim 20, further comprising distributing, by the network element, the advertisement user interface by notifying each of the plurality of targeted subscribers of a service or product offered in the advertisement user interface.

22. The method of claim 20, further comprising:

presenting, by the network element, an offer by way of the media processor to target subscribers of the media communication system with the advertisement user interface; and recording, by the network element, a fee applied to a billing statement of the media processor responsive to detecting an affirmative acceptance of the offer.

23. The method of claim 20, wherein the presenting, by the network element, of the bid to the media processor comprises presenting the bid by way of a media presentation device operably coupled to the media processor.

24. The method of claim 20, wherein the communication identification of the media processor corresponds to a communication identifier of a communication device associated with the media processor, wherein the presenting of the bid comprises transmitting the presentation of the bid to the communication device according to the communication identifier of the communication device, and wherein the communication identifier of the communication device comprises one of an E.164 number or a session initiation protocol uniform resource identifier.

25. The method of claim 20, wherein the media communication system corresponds to an internet protocol multimedia subsystem communication system, an internet protocol television system communication system, a cable television communication system, a satellite television communication system, or combinations thereof, and wherein the plurality of entries comprises a link to another webpage user interface that includes one of media content, advertisements, or a combination thereof.

26. The method of claim 20, wherein the other sources of behavioral data comprise one of usage behavior data collected from a communication device of a targeted subscriber of the plurality of targeted subscribers, usage behavior data collected from subscriber account information of the targeted subscriber of the plurality of targeted subscribers, usage behavior data collected from user preferences supplied by the equipment of the targeted subscriber of the plurality of targeted subscribers, or combinations thereof.

* * * * *